Figure 3:
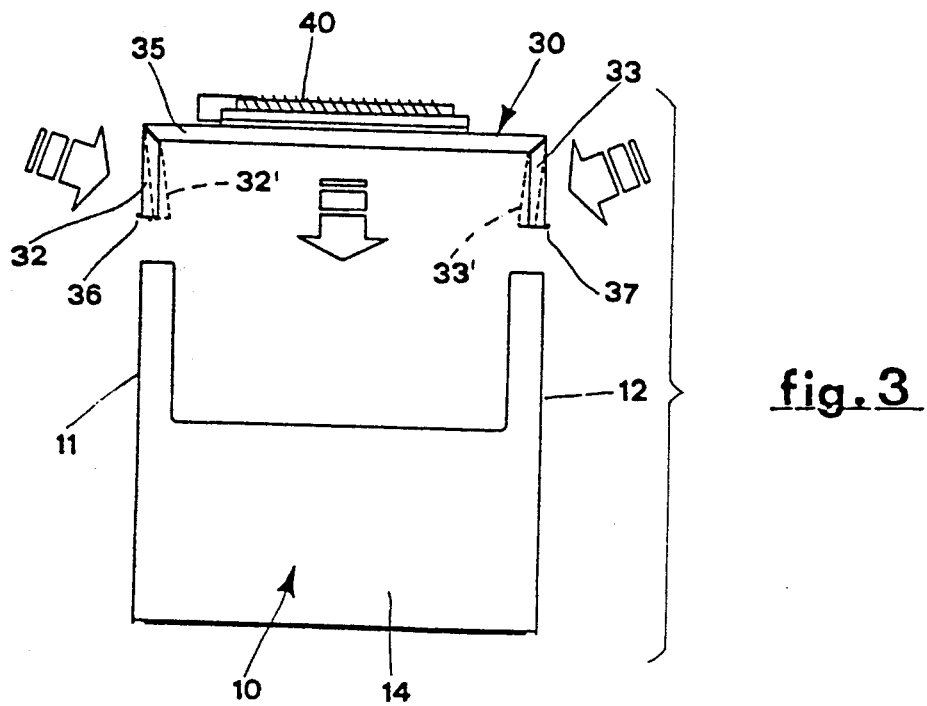

United States Patent [19]

Mastrippolito

[11] Patent Number: 5,073,978
[45] Date of Patent: Dec. 17, 1991

[54] BOX-SHAPED FRAME FOR REMOVEABLE CAR RADIOS, ADJUSTABLE IN DEPTH TO FIT RADIO SETS OF DIFFERENT LENGTHS

[76] Inventor: Giovanni Mastrippolito, Via Carlo Marx, 185, 20099 Sesto S. Giovanni (Milano), Italy

[21] Appl. No.: 573,017

[22] PCT Filed: Apr. 14, 1989

[86] PCT No.: PCT/IT89/00025

§ 371 Date: Nov. 5, 1990

§ 102(e) Date: Nov. 5, 1990

[87] PCT Pub. No.: WO89/10859

PCT Pub. Date: Nov. 16, 1989

[30] Foreign Application Priority Data

May 4, 1988 [IT] Italy ............................. 21171/88[U]

[51] Int. Cl.⁵ .......................... H04B 1/08; H05K 7/00
[52] U.S. Cl. ................................ 455/346; 248/27.1; 312/7.1; 361/422; 455/348; 455/349
[58] Field of Search .......................... 455/346–349, 455/351, 89, 345, 90, 128, 344; 312/7.1, 205; 224/281, 42.45 R; 361/390, 391, 422, 380, 429; 248/27.1, 27.3

[56] References Cited

U.S. PATENT DOCUMENTS

| 4,660,900 | 4/1987 | Paterlini | 312/7.1 |
| 4,699,341 | 10/1987 | Ponticelli | 248/27.1 |
| 4,895,326 | 1/1990 | Nimpoeno et al. | 248/27.1 |

FOREIGN PATENT DOCUMENTS

| 0018319 | 10/1980 | European Pat. Off. . |
| 0180035 | 5/1986 | European Pat. Off. . |
| 8421441.4 | 1/1986 | Fed. Rep. of Germany . |
| 2474452 | 7/1981 | France . |
| 2592345 | 7/1987 | France . |

*Primary Examiner*—Curtis Kuntz
*Assistant Examiner*—Chi H. Pham
*Attorney, Agent, or Firm*—Michael J. Striker

[57] ABSTRACT

Box-shaped frame (10) to carry removeable car radio sets (50) in motor vehicles, in which the position of the rear end (30), on which there are electric connections (41), is adjustable to adapt the frame to car radios (50) of different lengths, by means of a series (22), (23) of notches (24), (25) placed on the windows (21), (22) in the opposite sides of said frame (10), which notches (24) (25) can be penetrated by strip-like projections (36), (37), fixed to the edges of the short elastic sides (32) (33) of the above rear end (30).

3 Claims, 3 Drawing Sheets

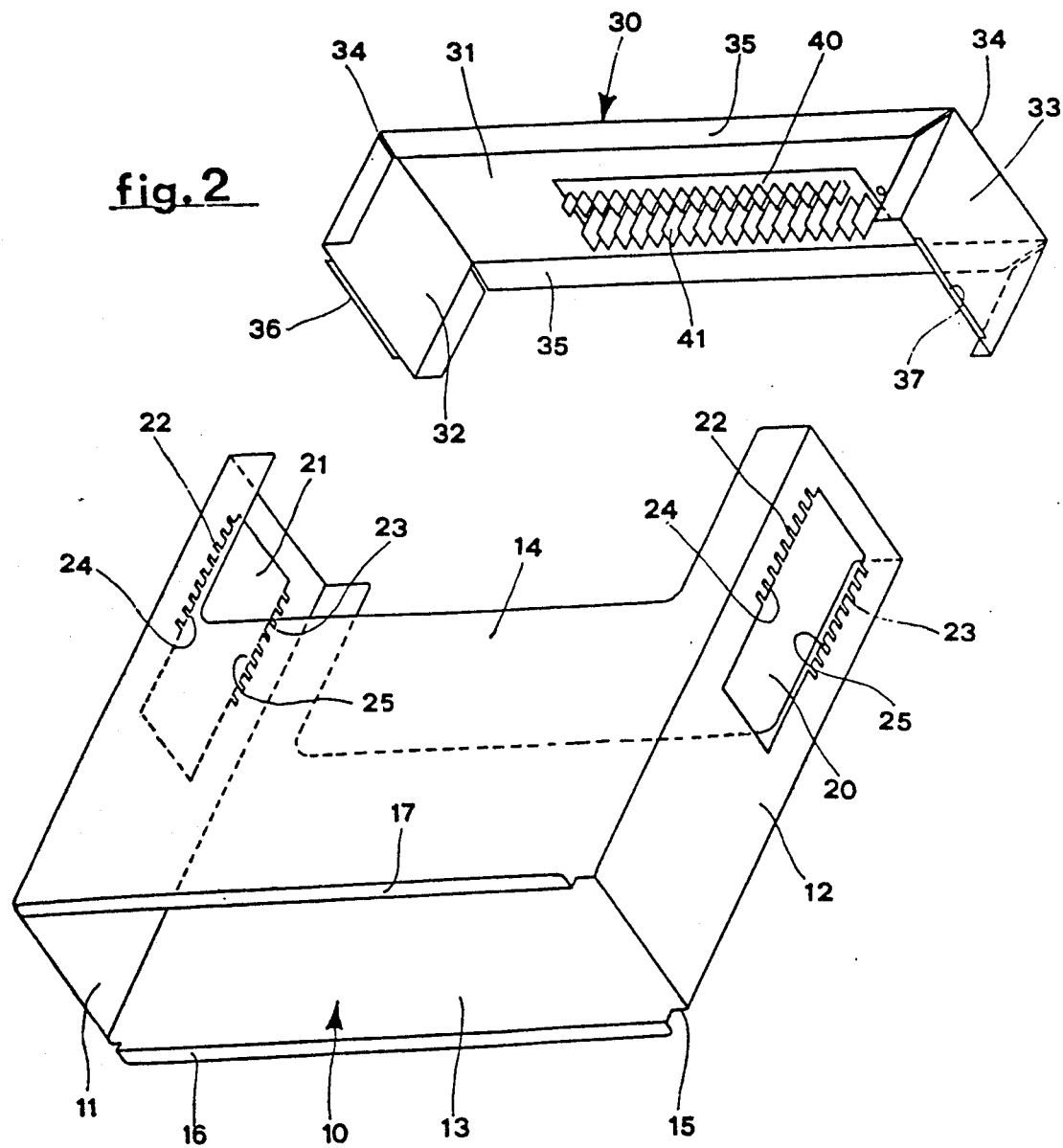

BOX-SHAPED FRAME FOR REMOVEABLE CAR RADIOS, ADJUSTABLE IN DEPTH TO FIT RADIO SETS OF DIFFERENT LENGTHS

The invention concerns a box-shaped frame, made to receive car radio sets, said frame having electric connections at its rear end.

During installation of radio receiving sets in motor vehicles it is well known that difficulties often arise over getting a good fit between the box-like spaces provided in said vehicles and the radio sets to go in them.

It frequently happens that the radio set for this purpose is longer than the depth of the space in which it has to go and consequently the set projects outward in front. The disadvantages so caused are: extra obstruction, a poor appearance and functional ureliability.

The contrary may also happen, namely that the space is too long for the radio set so that electric contacts on the one and the other do not match properly leading to discontinuity in the circuits to be created between those in the vehicle and those in the set.

An expert must therefore be called in to make what alterations are needed to adapt the set to the prepared aperture, or to replace said aperture with another, or else to buy a radio set that fits better into the one provided. The patent EPO 0 180 035 discloses a device for removably mounting a radio apparatus in motor vehicles.

Said device comprises a substantially tubular frame or housing, of a rectangular cross section, into which the car radio can be slid from the front, there being at the back a U-shaped carrier that can be moved in relation to said housing guided by channels made in its sides.

A connector for a source of electric power is fixed onto said U-shaped carrier, and lies opposite a connector for a source of electric power mounted on the car radio.

On inserting the radio into the tubular housing the two connectors plug into each other.

The U-shaped carrier is pushed towards the front end of the tubular housing, namely towards the car radio, by springs.

The free movement of the U-shaped carrier can clearly give rise to problems of efficiency for the contact between the two connectors.

If the springs were very strong this would create other problems as they would tend to push the radio outside the housing.

The device seems substantially to be complex with consequent risk of failure and considerable repair costs.

The above invention avoids the above drawbacks and, in addition offers other appreciable advantages as will be explained.

Subject of the invention is a box-shaped housing for removeable car radios mounted in motor vehicles, the position of the end section being adjustable to allow for any length of car radio.

Said adjustment is made possible by a number of fastening means placed longitudinally along the walls of the box-shaped housing and of the end section.

The fastening means consist of sets of notches made on the opposite edges of rectangular longitudinal windows cut in the sides of the box-shaped housing, and of projecting strips on the edges of the elastic sides of the end section and turned outwards so that they face towards the sides of the box-shaped housing in a position corresponding to said notches.

The length of the said strip projections is practically the same as the distance between the bottoms of the opposite sets of notches.

It is therefore possible, by manual action alone and without instruments, and overcoming the elastic resistance offered by the sides of the end section, to fit said strip projections into one or another pair of notches.

The end section remains firmly held in the desired position due to the elastic reaction of its sides.

The sides of the adjustable end section are connected to its rear wall at an angle of 90° and the locking strip projections are on the front edges of said sides.

The electric circuits of the car radio are connected to an electric connector mounted in an end plate applied to the back end of the radio, opposite an electric connector mounted on the adjustable end section of the box-shaped housing, so that one connector plugs into the other.

The advantages of the invention are clear.

By adjusting the depth of the box-like frame, mounted in the motor vehicle, the radio set can be inserted in the best position without any unpleasing and awkward obstruction, at the same time ensuring stable electric connections by matching up those on the adjustable rear end of the box-like frame with those on the radio set.

Depth of the same frame can, as explained, be adjusted in a simple and reliable manner.

The overall result can be summed up as functional, safe, pleasing in appearance and avoiding any outward obstruction.

All these advantages are obtained by simple and therefore inexpensive means.

Characteristics and purposes of the invention will be made even clearer by the following example of its execution illustrated by diagrammatic figures.

Figure 4:
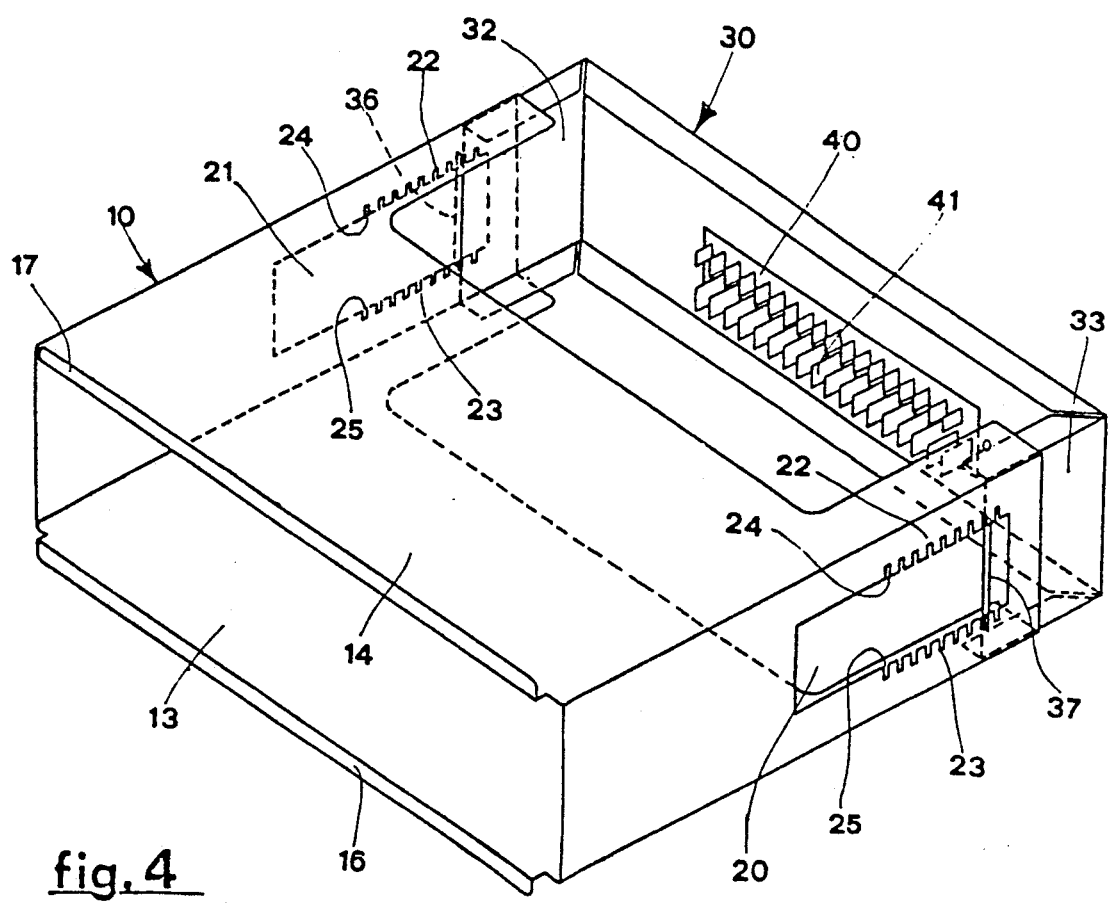
Figure 5:
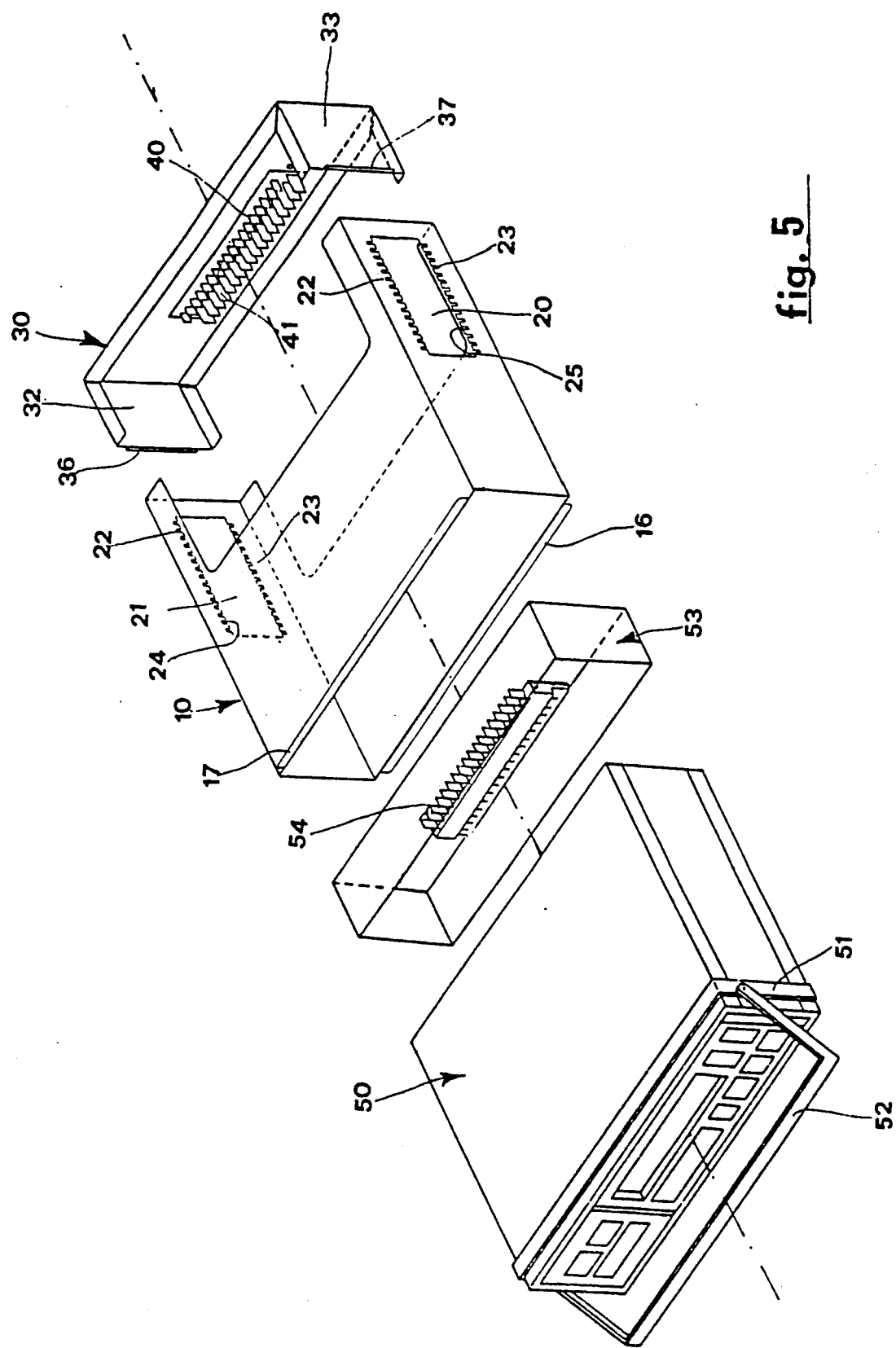

FIG. 1: Box-like frame, in perspective.
FIG. 2: Rear end of said frame, in perspective.
FIG. 3: Said frame and the rear end when being put together, seen from above.
FIG. 4: Frame and rear end when fitted together.
FIG. 5: Car radio set, connecting plate, box-like frame with its rear end all aligned in the stage of reciprocal association.

The box-like frame 10 comprises the sides 11, 12 and end sections 13, 14.

Tabs 16 and 17 on the front edge 15 hold the frame in position in the space made for it in the motor vehicle. The longitudinal Rectangular windows 20, 21 are made in the sides 11, 12 of the frame, there being at the top and bottom of said windows sets 22, 23 of opposing notches 24, 25 made to allow the rear end 30 to be fitted in.

The rear end 30 comprises a posterior back 31 and short elastic sides 32, 33 joined to said back at corners 34 at 90°. The top and bottom edges of said sides are reinforced by flaps 35, at 90°, while the leading edges have continuous strip-like projections 36, 37 on the horizontal centre-line axis of said short sides 32,33.

Said strip projections 36, 37 are slightly shorter than the distance between the tops and bottom so opposing notches 24, 26.

Electric connections 40 with contacts 41 are mounted on the rear end 30.

To fit said rear end firmly into the box frame 10, the former is brought close to the latter and, as shown by the central arrow in FIG. 3, sides 32, 33 are simultaneously pressed inwards, as shown by lateral arrows in FIG. 3, until they reach the position indicated by the dotted lines 32', 33'.

When so pressed said sides can be pushed into the box-like frame until the strip projections 36, 37 reach an opposing pair of notches 24, 25 giving said frame the right length in relation to that of the radio to go in it.

Once pressure is taken off sides 32,33 said frame and said rear end will be firmly held together as seen in FIG. 4.

FIG. 5 shows the radio 50 with surround 51 and handle 52 used to help pull it out.

Just behind the radio is the substantially parallelepiped plate 53 comprising electric connection 54 and sockets that match up with the contacts 41 of electric connection 40 on the rear end 30 of the box-like frame 10.

In this way electric contacts are ensured by simply pushing the radio set 50 in place inside the box-like frame 10.

I claim:

1. Box-shaped housing for receiving a removeable radio set in motor vehicles, with an end section being adjustable relative to the box-shaped housing to adjust the length of the housing and thereby to enable the housing to accommodate any length of car radio by the presence of fastening means placed longitudinally along the walls of the box-shaped housing and of the end section, characterized in that the fastening means include sets (22) (23) of opposingly situated notches (24) (25) placed on at least one of top and bottom edges of rectangular longitudinal windows (20) (21) cut in the sides (11) (12) of the box-shaped housing (10) and strip-shaped fixing projections (36) (37) on the edges of the elastic sides (32) (33) of the end section (30) turned outward away from the elastic sides (32) (33) and therefor towards the sides (11) (12) of the box-shaped housing (10) to correspond with said notches (24) (25), the length of said projections (36) (37) being practically the same as the distance between the respective bottom points of the opposingly situated sets (22) (23) of notches (24) (25) so that by manual action only and without tools overcoming the elastic resistance offered by the sides (32) (33) of the end section (33), said projections (36) (37) can penetrate into and another of said notches (24) (25), the end section (30) being held in the desired position by a close fit due to the elastic reaction of its sides (32) (33).

2. Box-shaped housing for receiving a moveable radio set in motor vehicles as in claim 1, characterized in that the sides (32) (33) of the adjustable end section (30) are connected to its back wall (31) by a 90° bend and in that the strip-shaped fixing projections (36) (37) are situated on the front edge of said sides.

3. Box-shaped housing for receiving a removeable radio set in motor vehicles as in claim 1, characterized in that the electric circuits of the car radio (50) are connected to an electric connector (54) mounted in an end piece (53) applied to the back of the car radio (50) and situated opposite an electric connector (40) mounted in the adjustable end section (30) of the box-shaped housing (10) so that one connector can plug into the other.

* * * * *